(12) United States Patent
Kurtz

(10) Patent No.: US 6,891,711 B1
(45) Date of Patent: May 10, 2005

(54) ULTRA-MINIATURE, HIGH TEMPERATURE, CAPACITIVE INDUCTIVE PRESSURE TRANSDUCER

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/820,357

(22) Filed: Apr. 8, 2004

(51) Int. Cl.[7] .................................................. H01G 7/00
(52) U.S. Cl. .................. 361/277; 361/303; 361/305; 361/283.1; 361/283.3; 361/290; 361/291
(58) Field of Search ................................. 361/277, 278, 361/281, 283.1, 283.3, 287, 290, 291, 293, 303, 305, 280, 286, 299.1

(56) References Cited

U.S. PATENT DOCUMENTS

| | | | |
|---|---|---|---|
| 3,748,571 A | 7/1973 | Kurtz | 323/74 |
| 4,814,845 A | 3/1989 | Kurtz | 357/26 |
| 5,099,386 A * | 3/1992 | Stokes et al. | 361/298.5 |
| 5,955,771 A | 9/1999 | Kurtz et al. | 257/419 |
| 5,973,590 A | 10/1999 | Kurtz et al. | 338/42 |
| 6,210,989 B1 | 4/2001 | Kurtz et al. | 438/51 |
| 6,252,759 B1 * | 6/2001 | Lange et al. | 361/283.1 |
| 6,606,235 B2 * | 8/2003 | Chua et al. | 361/278 |
| 6,690,569 B1 * | 2/2004 | Mayer et al. | 361/303 |
| 6,781,814 B1 * | 8/2004 | Greene | 361/283.1 |

* cited by examiner

*Primary Examiner*—Dean A. Reichard
*Assistant Examiner*—Nguyen T. Ha
(74) *Attorney, Agent, or Firm*—Plevy Howard & Darcy, PC

(57) ABSTRACT

An ultra miniature high temperature capacitive inductive pressure transducer is fabricated by MEMS techniques. The transducer consists of two separated pieces of silicon which form the plates of the capacitor, one of which plate is micromachined in such a way to allow a controlled deflection with pressure. The gap between the two capacitive plates is determined by an extending rim on one of the two plates. The two pieces of silicon are subsequently fusion bonded, leading a very small gap between the two plates. An inductor is formed on the top surface of one of the pieces of silicon by sputtering metal in a spiral like fashion on the back side of the non-micromachined plate.

20 Claims, 3 Drawing Sheets

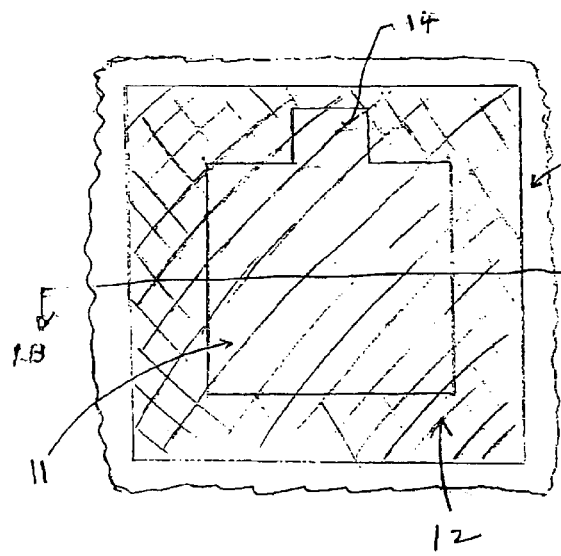
FIG. 1A
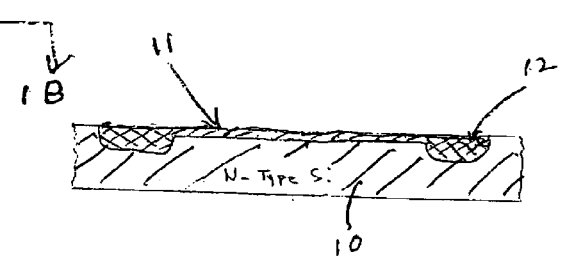
FIG. 1B
FIG. 2
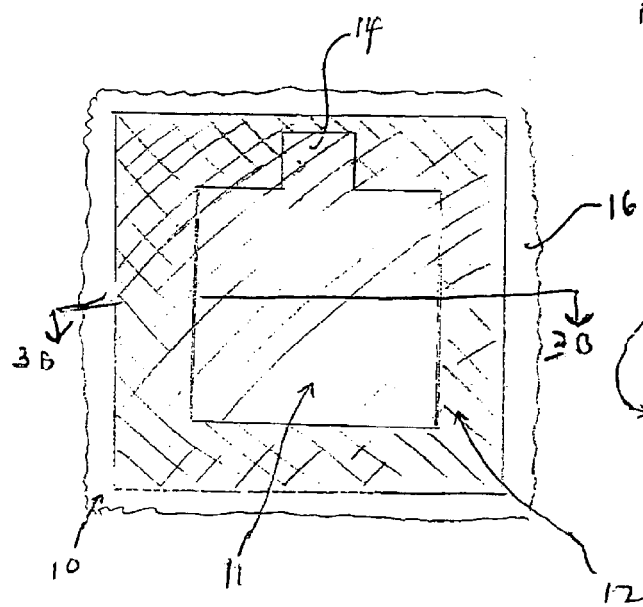
FIG. 3A
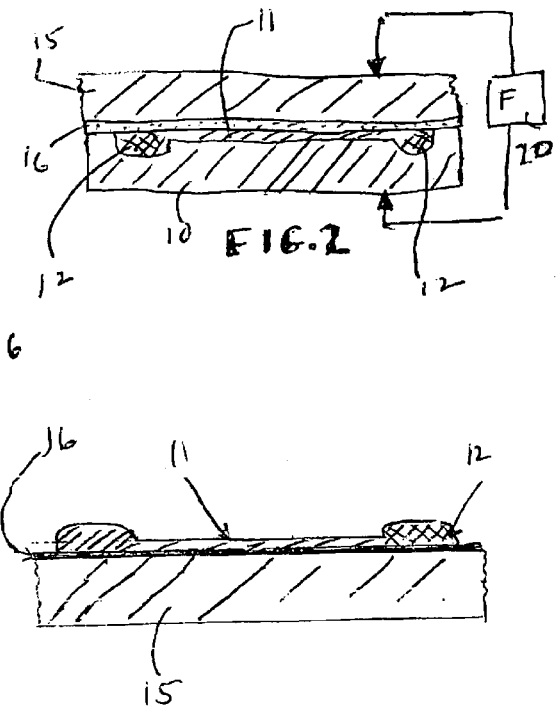
FIG. 3B

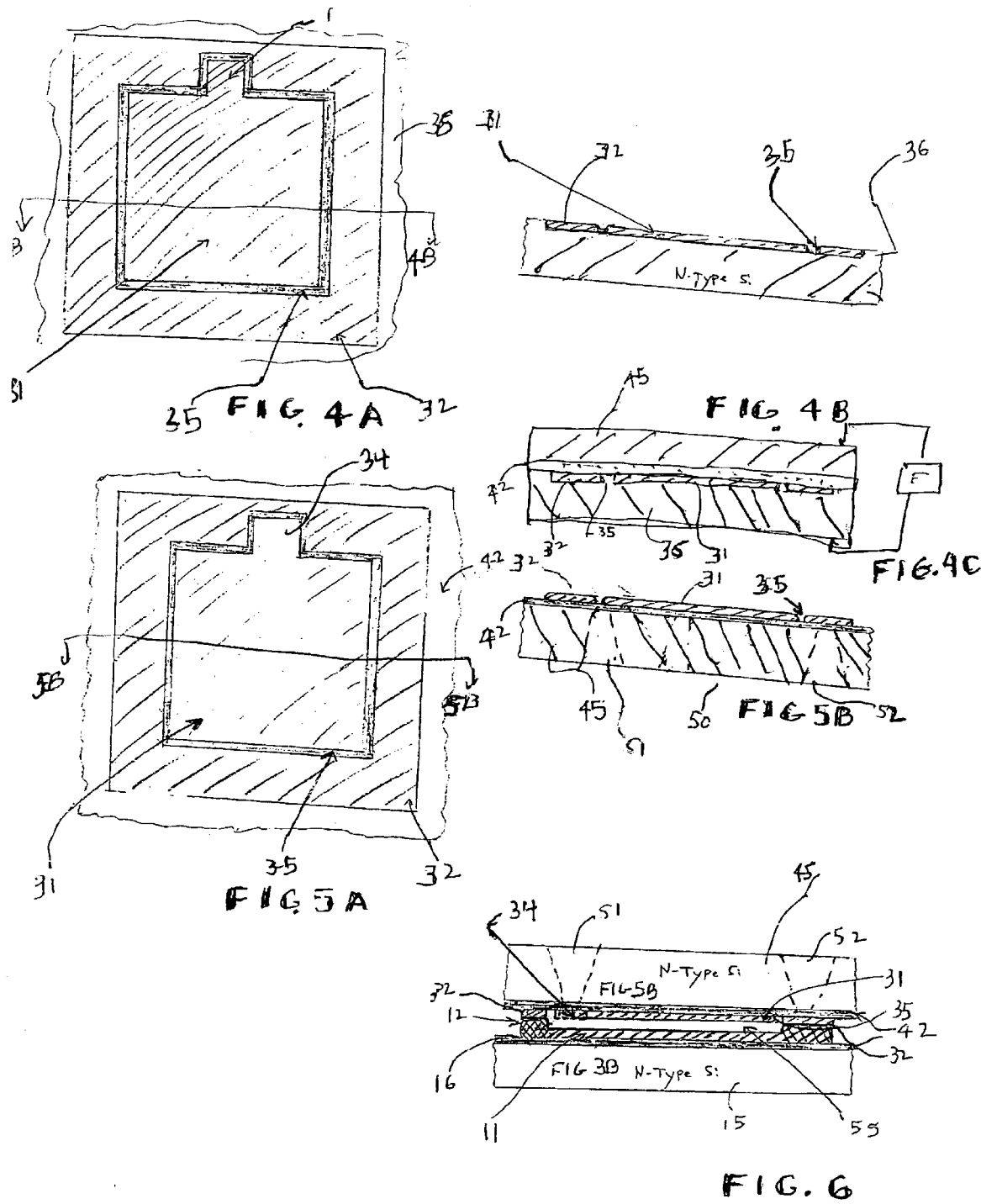

ULTRA-MINIATURE, HIGH TEMPERATURE, CAPACITIVE INDUCTIVE PRESSURE TRANSDUCER

FIELD OF INVENTION

This invention relates to pressure transducers, and more particularly, to a pressure transducer employing a capacitor and inductor which is fabricated by microelectronic mechanical system techniques (MEMS).

BACKGROUND OF THE INVENTION

The prior art includes a wide variety of devices which generally fall into the broad category of pressure transducers. As one can ascertain, certain of these devices employ piezoresistive elements. These elements exhibit a change in resistance as a function of an applied force or pressure. Another class of pressure transducers employ a variation of capacity to determine the magnitude of an applied force. These devices operate to vary effective capacity between a movable plate and a stationary plate. The movable plate can also be a flexible diagram which will deflect upon application of a suitable force by an amount proportional to the force. The motion of the plate serves to vary the effective distance between the movable plate and the fixed plate. As is well known, the distance between two parallel plates determines the magnitude of the effective capacitance. Capacitive transducers are usually difficult to fabricate and are not necessarily compatible with conventional integrated circuit techniques.

Reference is made to U.S. Pat. No. 3,748,571 entitled, "Pressure Sensitive Transducers Employing Capacitive and Resistive Variations" which issued on Jul. 4, 1973 to A. D. Kurtz, the inventor herein, and is assigned to the assignee herein. Reference is also made to U.S. Pat. No. 4,814,845 entitled, "Capacitive Transducers Employing High Conductivity Diffused Regions". This patent issued on Mar. 21, 1989 to A.D. Kurtz and is assigned to the assignee herein. As one can ascertain from U.S. Pat. No. 4,814,845, it shows a semiconductor capacitive transducer which is fabricated by utilizing layers in a sacrificial wafer. By processing the sacrificial wafer, one can obtain a P+ region which is indicative of one plate of the capacitor. A carrier wafer has a dielectric layer on a top surface which includes a layer of glass. The sacrificial wafer, after being subject to diffusion of highly doped semiconductor materials, contains a peripheral flange and a capacitive region which is indicative of a capacitive plate. By utilizing selective etching, one can thus form a capacitive structure on a sacrificial wafer which is bonded to the carrier wafer by means of an electrostatic bond. This device is, in fact, compatible with semiconductor processing techniques.

As one can ascertain, such capacitive devices can be connected in arrangements for use in conjunction with an inductor to provide frequency outputs which are proportional to the force or applied stress. It is also indicated that one can utilize such capacitive transducers together with inductors to also obtain resonant circuits which frequency would change upon application of a force to vary the capacitive component of the resonant circuit.

The present invention relates to the fabrication of an improved capacitive inductive pressure transducer which is fabricated by MEMS techniques and essentially, provides an ultra-miniature high temperature device.

SUMMARY OF INVENTION

An ultra-miniature, high temperature, capacitive inductive pressure transducer is fabricated by MEMS techniques. The transducer consists of two separated pieces of silicon which form the plates of the capacitor, one of which plate is micro machined in such a way to allow a controlled deflection with pressure. The gap between the two capacitive plates is determined by a protuberance on one of the two plates, which are subsequently fused together in vacuum leaving a very small gap between the two plates (on the order of $0.5 \times 10^{-3}$ inches). The inductor is formed by sputtering metal in a spiral like fashion on the back side of the non-micro machined plate. Each plate preferably consists of a section of N type silicon, a silicon dioxide layer and a P+layer on top of the silicon dioxide. On the bottom plate, the P+region forms the rim around the plate and is raised such that when the plates are joined, the gap between the plates is determined. A provision is made to bring out separate electrical contacts from both plates, as well as contacts for the spiral inductor, to the back of the non-deflecting plate wafer. On the back side is bonded a glass member having appropriate holes, which provides access to the four contacts required (i.e. two for the two plates of the capacitor and two for the two ends of the inductor). The entire structure can now be mounted on the header using a miniature header and a glass metal frit. See U.S. Pat. No. 6,210,989 entitled, "Ultra Thin Surface Mount Wafer Sensor Structure and Methods of Fabricating the Same" which issued on Apr. 3,2001 to A. D. Kurtz et al. and is assigned to the assignee herein. See also U.S. Pat. No. 5,973,590 of the same title and issued on Oct. 26, 1999 to the inventor and assignee herein. See also U.S. Pat. No. 5,955,771 entitled, "Sensors for Use in High Vibrational Applications and Methods for Fabricating Same" which issued on Sep. 21, 1999 to A. D. Kurtz et al. A number of unanticipated advantages arise from this structure.

a) The very small gap between the two plates gives rise to a large unstressed capacitance.
b) The ability to vary the separation of the two plates with pressure is determined by the deflection of the deforming plate and small deflections of the deforming plate will result in very large changes in the capacitance.
c) Because the plates are separated by a vacuum, the variation of capacitance with temperature is very small in both the pressurized or the un-pressurized state.
d) Use of solid state fabrication techniques result in a very high temperature transducer structure and one in which all circuit elements are hermetically sealed from any environment.
e) The resulting structure will have a very high resonance frequency, much higher than any normal capacitive transducer type.
f) The use of solid state techniques permits the fabrication of a very small inductor, which still has a high and controllable inductance.
g) Because of the use of IC technology, a small, cheap highly accurate transducer will result.

This device is intended to be used in a LC circuit where the pressure change in capacitance changes the natural frequency of the circuit and require an on-board voltage supply for measurement (i.e. the LC circuit to resonate by means of an external transmitter-receiver).

DESCRIPTION OF THE FIGURES

FIG. 1A is a top plan view of a section of a semiconductor wafer depicting a first processing step in forming a transducer, according to this invention.

FIG. 1B is a cross sectional view taken through line B—B of FIG. 1A.

FIG. 2 is a cross sectional view depicting a step of fusion bonding utilized in this invention.

FIG. 3A is top plan view similar to FIG. 1A depicting a further step in the process of fabricating a transducer, according to this invention.

FIG. 3B is a cross sectional view taken through line 3B—3B of FIG. 3A.

FIG. 4A is a top plan view of a section of a wafer depicting a further step in forming a transducer.

FIG. 4B is a cross-sectional view taken through line 4B—4B of FIG. 1.

FIG. 4C depicts a cross sectional view of a fusion bonding process concerning the bonding of the wafer shown in FIG. 4A.

FIG. 5A is a top plan view showing another step in the process of forming a transducer, while FIG. 5B is a cross sectional view taken through line B—B of FIG. 5A.

FIG. 6 is a cross sectional view showing a first processed wafer being fusion bonded to a second processed wafer.

DETAILED DESCRIPTION OF THE FIGURES

Figure 7:
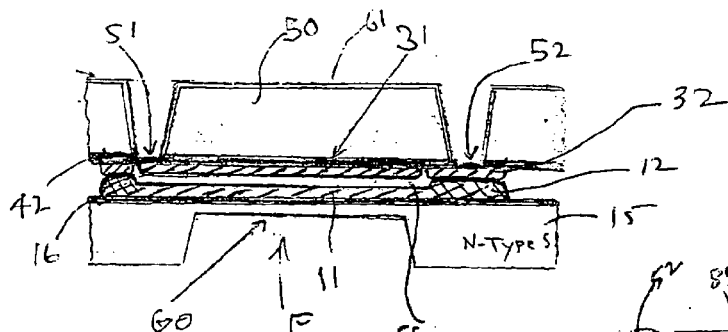
FIG. 7 is a cross sectional view showing additional steps performed on the wafer of FIG. 6.

As indicated, a major aspect of the present invention is the use of MEMS techniques to fabricate a transducer having a capacitance and an inductor. It is, of course, understood, as will be explained, that the fabrication of the capacitance alone is also unique resulting in a novel capacitor apparatus. While the final product presents a unique pressure transducer, it is understood that the device is intended for use in an LC circuit where an applied pressure changes the capacitance and, therefore, changes the resonant frequency of the circuit. The fabrication techniques to be described herein depict the fabrication of the transducer in a step by step technique. These techniques are generally referred to as microelectronic mechanical system techniques (MEMS).

As one can ascertain, the above-described semiconductor techniques enable one to produce transducers utilizing semiconductor processing techniques which operate at extremely high temperatures. These devices, apart from having dielectrically isolated components, also have and utilize glass wafers and are essentially referred to as leadless type devices. High temperature operation is extremely important for a pressure transducer, especially for the type of transducer to be described below.

Reference is made to FIG. 1A and FIG. 1B. As one can ascertain, FIG. 1A is a top plan view of a semiconductor wafer being patterned to provide a transducer after a series of processing steps. FIG. 1B is a cross sectional view taken through line 1B—1B of FIG. 1A to show a first processing step in fabricating the transducer.

Referring to FIG. 1A, there is shown an outline of a portion of a wafer 10 which, for purposes of this example, is fabricated from N-type silicon. The wafer 10 is shown in partial view, as one can understand, that the processes, can be implemented on a large wafer with virtually hundreds or thousands of such circuits fabricated during single operations. To ease the explanation, the process being depicted will be shown in one particular area of a larger wafer.

The first thing that occurs in fabricating a transducer is to provide a photolithographic pattern, whereby the plate portion, which will be referred to as the lower plate of the capacitor, is located in area 11. Area 11, as can be seen, is generally of rectangular or a square shape and has a top smaller square or tab section 14. It is, of course, understood that this is just one geometrical configuration and is depicted as a relatively square or rectangular array. For example, it is understood that other geometric configurations can be employed as well, such as, for example, circular, triangular and so on. The geometric configuration of the capacitor or the transducer has no particular significance, but is chosen for the sake of simplicity.

There is an area 12 which surrounds the periphery of the area 11. The area 12 is referred to as a contact rim and essentially, as will be explained, finally forms a first contact for the capacitance component of the transducer. This area is diffused to a deeper depth than the lower plate area 11. The general aspects of the depth of diffusion is shown in FIG. 1B, where the contact or rim area is again depicted by reference numeral 12, with the bottom plate area 11 shown to be of a lesser height than the surrounding contact rim area 12. It is also noted that the area of the N-type silicon wafer, which surrounds the contact rim area 12, is not diffused. It is again indicated that many such diffusions can occur on a wafer of N-type silicon, as more than one process as shown in FIG. 1A can be implemented at the same time. The difference in the diffusion depths between the rim 12 and the lower plate 11 will eventually dictate the distance of separation between the top and lower plates of the capacitor. The diffused areas employ a P+diffused pattern into the N-type silicon wafer 10. Such diffusion processes are well known.

Referring to FIG. 2, there is shown the next step in the process. The wafer of FIG. 1 is now fusion bonded to a wafer 15 also of N-type silicon which wafer 15 has an oxide layer 16 grown thereon. The process of fusion bonding, as depicted by reference numeral 20, is well known and many of the patents assigned to Kulite, including the cited patents, use fusion bonding techniques. Essentially, as seen in FIG. 2, the pattern wafer 10 is bonded to an oxidized substrate, which includes wafer 15 having a layer of silicon dioxide 16 thereon.

In the procedure shown in FIGS. 3A and 3B, the non-diffused areas of the wafer 10 are selectively etched away. This is done by removing the nondiffused areas on the wafer 10, which is the bottom pattern wafer. The lower plate 11, with the surrounding rim 12, is thus transferred onto the substrate wafer 15 and is dielectrically isolated from the substrate wafer 15, creating a dielectrically isolated pattern. This is clearly seen in FIGS. 3A and 3B, where the same reference numerals are utilized to show corresponding parts. Again, consistent with FIG. 1, FIG. 3A shows a top plan view of the wafer, which basically looks very similar to the top plan view of FIG. 1A, with the exception that the configuration shown in FIG. 3A is now inverted, as compared to FIG. 1B. The lower plate 11, as well as the surrounding contact rim 12, is now depicted as shown. Therefore, as one can ascertain, the capacitor plate 11, including the surrounding rim 12, are now positioned on a dielectric layer 16 associated with the oxidized substrate 15. It is also indicated that the lower plate region 11 and the contact region 12 are both patterned by utilizing P+diffusion. Diffusion into an N-type substrate using P+impurities is very well known and one employs conventional photolithographic techniques to defer all the patterns prior to diffusion.

FIG. 3B shows the lower plate structure of the transducer to be formed. It is seen from FIG. 3B, that the contact rim 12 is higher and extends above the lower plate area 11, both of which are dielectrically isolated by the layer of silicon dioxide 16 on wafer 15.

Referring to FIG. 4A, there is shown the fabrication of a top plate of a transducer according to this invention. As seen from FIG. 4A, there is shown a top plan view of the wafer 36 with FIG. 4B showing the cross sectional view taken through line 4B—4B of FIG. 4A. As one can ascertain from FIG. 4A, the configuration looks very similar to FIG. 1A. The same pattern, as shown in FIG. 4A, is diffused into a wafer 36 which provides a top plate area 31 with a surrounding moat 35. The outer region 32 is a rim region. As seen from FIG. 4B, the pattern is diffused utilizing appropriate P+diffusion into the N-type silicon wafer 36. In this pattern, the diffusion conditions are the same for both the top plate area 31 and the contact rim area 32. There the rim area 32 is of the same width or height as the plate area 31. It is understood that the height of the rim can be greater as for the lower plate to again determine capacitance value by controlling the separation or distance between the plates. An isolation moat 35 is produced in between the contact rim and the top plate pattern area 31. This moat will electrically isolate the contact rim 32 from the top capacitor plate region 31. As will be explained, area or tab 34 will be a future contact region. The area is located somewhat outside the plate area (into the contact rim area). This region 34 will eventually serve as a future contact to the top capacitor plate. The location of this contact will be directly adjacent to and located above the shallow region in the contact rim found on the lower plate wafer. This is depicted in FIG. 1A as 14.

Thus, as seen in FIG. 4B, there is shown a top plate configuration fabricated on a wafer 36. As can be seen, comparing FIGS. 3B with 4B, the top plate 31 has the contact rim 32 surrounding it and approximately the same height, as indicated, the height can be varied by controlling the diffusion rate of the plate region compared to the rim region. There is an isolation moat 35 separating the rim 32 from the plate 31.

In FIG. 1B, the rim 12 is higher than the lower plate 11 and there is no separation or moat between the same. Referring to FIG. 4C, the structure shown in FIG. 4B is now fusion bonded to the wafer 45. This is the exact type of fusion that is shown in FIG. 2. In this fusion bonded technique (FIG. 4C), the wafer 45 may be a semiconductor wafer such as N-type silicon or may, for example, be glass as a Pyrex wafer. Pyrex is completely compatible with silicon.

If a silicon substrate wafer is used, a fusion bonding is performed and the pattern-impressed-upon wafer 36 is now transferred to a carrier wafer 45 which has been oxidized to produce a dielectrically isolated structure. The pattern or wafer 45 is dielectrically isolated by the layer 42 of silicon dioxide on wafer 50. One can also see the moat area 35 as surrounding the top plate area 31.

Referring to FIGS. 5A and 5B, and for ease of fabrication, contact through-holes 51 and 52 are micromachined into the substrate wafer 45 prior to bonding it to the pattern wafer. This wafer can be made of Pyrex or out of silicon, as indicated above. If silicon is selected, the wafer must be oxidized after micromachining of the through-holes 51 and 52 and for electrical isolation. It is indicated that fabrication of the wafer from silicon is preferred. It is, of course, understood that if the bonded wafer was Pyrex, then there would be no requirement for the layer 42 of silicon dioxide, as the Pyrex acts as a substrate and is a dielectric. Therefore, as shown in FIG. 4C, the wafer 45 can either be a silicon wafer which is oxidized, such as the wafer 15 of FIG. 2, or can be a Pyrex wafer 45 where oxidation is not required. Again, in implementing the process, all non-diffused areas of the original wafer 36 are etched away leaving the pattern which consists of the contact rim 32 and the top plate area 31 positioned on a dielectrically isolated substrate 45. If the substrate 45 were silicon, then a layer of $Sio_2$ 42 would isolate the components 31 and 32 from the substrate.

Referring to FIG. 6, there is shown the step of forming a capacitor by utilizing the wafer shown in FIG. 3B and fusion bonding that wafer to the wafer shown in FIG. 5B. As seen, the wafer shown in FIG. 5B is inverted and placed on top of the wafer shown in FIG. 3B, with the rim areas as 12 and 32 in contact. The two wafers are fusion bonded. In the configuration shown, the contact plate 31, which is the top plate, is not electrically connected to either the contact rim, nor to the lower capacitor plate 11. The contact rim 12 from the lower plate 11 gets bonded to the contact rim 32 of the top plate wafer. Thus, electrically and mechanically connecting both contact rims into one. As seen in FIG. 6, the composite contact rim, although it surrounds the entire plate area, has slightly less seal on the left side of the device to accommodate room for the future contact 56 made to the top plate 31. The contact to the top capacitor plate 31 cannot be in contact with the underlying rim 12 of the bottom plate 11.

As can be seen in FIG. 6, there is now a gap 55 between the top and bottom capacitor plates 11 and 31. It also can be seen in FIG. 6 that one through-hole 52 enables contact to the lower plate 11 via the composite contact rim. The other through-hole 51 contacts the tab 34 of the plate 31, allowing contact to the plate 31.

As seen in FIG. 7, using conventional etching techniques, the back side of the lower plate wafer 15 is micromachined to form a deflecting area 60. As seen, the wafer is thinned underneath an area of plate 11 so that when area 60 is exposed to a force F, the plate 11 will deflect. Thus, thinning the area 60 will allow the lower capacitor plate 11 to deflect under applied pressure. Once the pressure is applied, the plate deflects and the gap 55 between the plates 11 and 31 changes the capacitance.

Also shown in FIG. 7 is that apertures 51 and 52 are machined out or etched out to form the apertures for receiving contacts. As seen in FIG. 7, the surface 61 of the wafer 50 is where the final inductor will be positioned.

Figure 8:
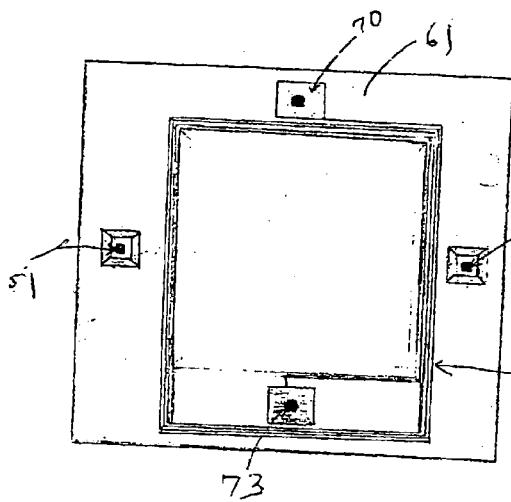
FIG. 8 is a top plan view of the formation of an inductor on the surface of the completed wafer shown in FIG. 7.

Referring to FIG. 8, there is shown a top view of the wafer shown in FIG. 7. Essentially, the inductor 72 is a coiled series serpentine helical arrangement fabricated by a metal process as RF sputtering using conventional photolithographic techniques. As seen, the inductor 72 is associated with a first contact 70 and a second contact 73. Eventually, the inductor 72 will be located inside a hermetically sealed cavity. The contacts to the inductor are both located on the thick regions of the peripheral side of the chip and the contacts are patterned and diffused prior to them being metallized. It is noted that that size, shapes and locations of the contacts, as well as the shape of the conductor can be adjusted to accommodate improvements in the design, layout and to control the value of the inductor in the entire LC circuits. Also shown are the capacitor contacts 51 and 52, which are directed to the bottom plate contact and the top plate contact of the capacitor. Thus, the capacitor and inductor can be wired in parallel or in a series circuit by connecting contacts 70, 51, 52 and 73 appropriately.

Figure 9:
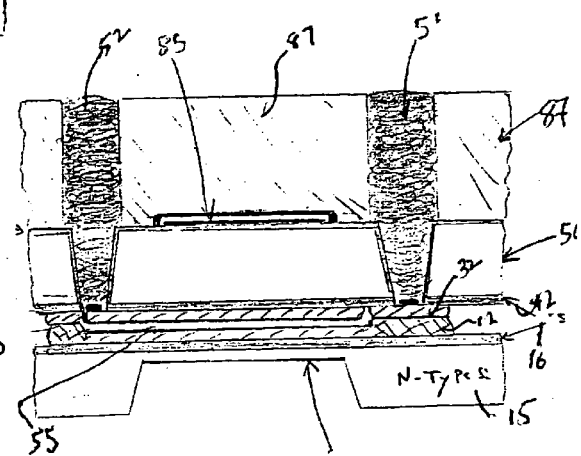
FIG. 9 is a cross sectional view showing the wafer in FIG. 6 being bonded to a contact glass wafer.

Also seen in FIG. 9 is a contact glass member 87 which hermetically seals the inductor. As seen, the contact glass member 87 has a recess 85 which encircles the inductor 72 residing on the top surface 61 of the substrate 50 associated with the top plate 31 of the capacitor. The glass member 87 functions to hermetically seal the inductor and to enable the contacts to be protected from environmental conditions. This leadless approach has been shown in the above-noted patents, namely, U.S. Pat. No. 6,210,989. In order to hermetically seal the inductor and to enable the contacts to be protected from environmental conditions, one uses this approach. Glass member 87 is fabricated so it is bonded to the top or the contact side of the composite chip, which basically would be the surface 61 of FIG. 8. This would leave only the lower plate of the capacitor exposed to applied pressure, while hermetically sealing everything else. The contact glass 87 has four through-holes located adjacent to contact areas on the chip. The contact glass member is bonded to the composite chip and the through-holes, such as 51 and 52, including the holes in the glass, such as 90 and 91, are filled with glass metal frit, thus eliminating use of wire bonds. The chip is now ready to be mounted to a header.

Figure 10:
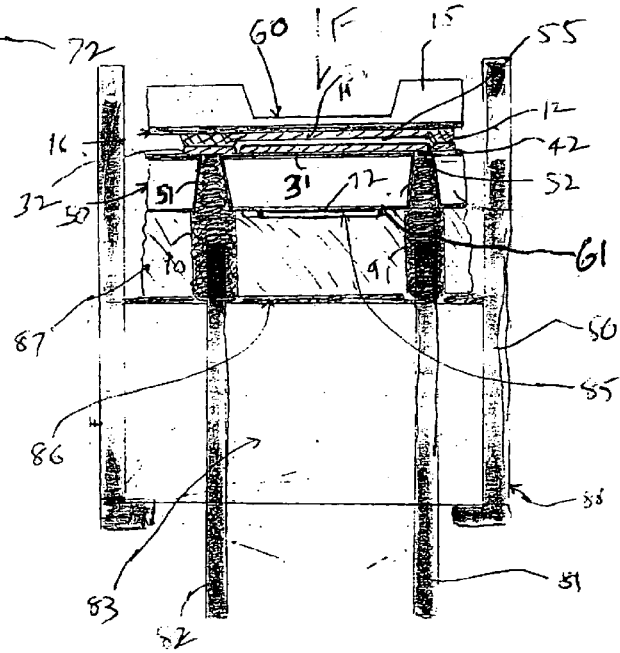
FIG. 10 shows a cross sectional view of a complete pressure transducer as mounted in a header associated with terminal pins.

Referring to FIG. 10, there is shown a completed transducer. As one can see, the top plate 31 with the thinned deflection region 60 is positioned at the top of a housing 80. The top plate deflects upon application of a pressure thereto, designated by arrow F. The spacing between the plates 11 and 31 varies according to the applied pressure and, therefore, changes the capacitance. As seen in FIG. 10, the chip gets placed upside down, where now the lower plate 11 becomes the upper plate. The upper plate 31, as described, is now the lower plate of the capacitor. The frit filled apertures, such as 90 and 91, are directly aligned over the pins 81 and 82 from the header. The pins, as 81 and 82 from the header, penetrate inside the through-holes and then the glass metal frit inside the through-holes. The remaining contacts (not shown) are also connected as described herein. Once the chip is mounted to the header, as shown, the lower plate of the capacitor appears on top, while the top layer appears on the bottom. The pressure is applied in the direction of arrow F. Thus, as one can ascertain, a capacitor inductor transducer is fabricated using MEMS technology. The resulting device has many advantages over prior art devices.

For example, using the above techniques an extremely small gap between the plates can be implemented, which gives rise to a large, unstressed capacitance. One has the ability to vary separation of the two plates by changing the geometry of the rims. The plates with pressure is determined by deflection of the deforming plate, small deflections result in large changes of the capacitance. Because the plates are separated by a vacuum, the variation of capacitance with temperature is extremely small. Use of the solid state fabrication techniques result in a very high temperature transducer, which all circuit elements are hermetically sealed from any environment. The resulting circuit has a very high resonant frequency and one can now fabricate extremely small capacitors and inductors for extremely reliable operation.

As indicated above, while a novel capacitor structure is defined, it is also seen that the pressure transducer contains an inductor. The capacitor and the inductor form a resonant circuit which is hermetically sealed in regard to both the capacitor and inductor components. Each device is further dielectrically isolated. The processes and techniques utilized provide high temperature operation for a pressure transducer. One use, for example, of such a device would be to place the resonant circuit transducer as, for example, shown in FIG. 10, within a hostile environment, such as an aircraft engine or in an automobile engine, where the temperatures are extremely high. In this manner, the resonant circuit is positioned to monitor a given pressure by applying the pressure as, for example, shown in FIG. 10. The resonant circuit can be excited by a remote pulse being transmitted to the resonant circuit which will cause the circuit to resonate and thereby, produce an output frequency. This output frequency is provided without any power supplied, as the circuit is excited by the external transmitted signal. As the pressure varies, the frequency of the resonant circle will vary because of the change in capacitance. Therefore, one can monitor the frequency as varying during and after each of the pulse intervals to determine the pressure in a hostile environment. It is also noted that the transducer arrangement requires no wires and no power supplies and is excited, as indicated by a remote transmitter which may be a pulse or other source.

It should be clear to one skilled in the art that many alternatives can be implemented and all are deemed to be encompassed within the spirit and scope of the claims appended hereto.

What is claimed is:

1. A capacitor apparatus comprising:
    a first semiconductor wafer having a top surface coated with a dielectric material and having disposed on said dielectric material a highly doped semiconductor first plate region surrounded by a highly doped first peripheral rim,
    a second wafer having a dielectrically isolating top surface and having disposed on said top surface a second highly doped semiconductor plate region surrounded by a highly doped second peripheral rim, with said rim of said second wafer isolated from said second plate by a peripheral moat providing electrical isolation between said second plate and said second rim,
    said first and second wafers bonded together at said rims to form a capacitor having said first and second plates spaced apart by a distance determined in part by the height of one of said rims.

2. The capacitor apparatus according to claim 1 wherein said first wafer has a recessed area on a bottom surface, said recessed area positioned with respect to said first plate to allow said first plate to deflect upon application of a force to said recessed area, whereby the value of capacitance changes with respect to said deflection and therefore, according to the magnitude of said force.

3. The capacitor apparatus according to claim 2 further comprising,
    a spiral conductor disposed on the bottom surface of said second wafer, said inductor having first and second terminals located for connection to said first and second capacitor contacts to form a resonant circuit providing a frequency output proportional to said applied force.

4. The capacitor apparatus according to claim 3 wherein said inductor is a metal spiral deposited on said second wafer by RF sputtering or other deposition means.

5. The capacitor apparatus according to claim 3 further including means for hermetically sealing said resonant circuit in a housing.

6. The capacitor apparatus according to claim 1 further comprising a first aperture located on said second wafer and directed from a top to bottom surface to communicate with said bonded rims, said aperture filled with a conductive material to form a first contact for said capacitor,
    a second aperture located on said second wafer and directed from said top to said bottom surface to contact said second plate, said second aperture filled with a conductive material to form a second contact for said capacitor.

7. The capacitor apparatus according to claim 1 wherein said first and second wafers are bonded together by a fusion bond.

8. The capacitor apparatus according to claim 1 wherein said first wafer is an N-type silicon wafer having a coating of silicon dioxide.

9. The capacitor apparatus according to claim 8 wherein said highly doped regions are P+diffused regions.

10. The capacitor apparatus according to claim 1 wherein said second wafer is a Pyrex glass wafer.

11. The capacitor apparatus according to claim 1, wherein said second wafer is an N-type silicon wafer with said dielectrically isolating top surface being a layer of silicon dioxide.

12. The capacitor apparatus according to claim 1 wherein said first and second plate regions are relatively congruent.

13. The capacitor apparatus according to claim 1 wherein said rim of said second wafer is higher than said second plate area.

14. The capacitor apparatus according to claim 1 wherein said rim of said second wafer is the same height as said second plate area.

15. The capacitor apparatus according to claim 1 wherein said first plate region is generally rectangular in shape and having an extending tab on one side.

16. The capacitor apparatus according to claim 15 wherein said second plate region is generally rectangular in shape and having an extending tab on one side and is relatively congruent to said first plate region when said extending tabs facing each other.

17. The capacitor apparatus according to claim 16 wherein said extending tab of said second plate region is a contact tab to provide a contact area for said second plate region.

18. The capacitor apparatus according to claim 1 wherein the height of said first rim determines the spacing between said first and second plate regions and, therefore the magnitude of said capacitor.

19. The capacitor apparatus according to claim 1 wherein the height of said second rim determines the spacing between said first and second plate regions and, therefore, the magnitude of said capacitor.

20. The capacitor apparatus according to claim 1 wherein said highly doped semiconductor first plate and said first rim are disposed on said dielectric material by a fusion bond.

* * * * *